2,978,690
         Patented Apr. 4, 1961

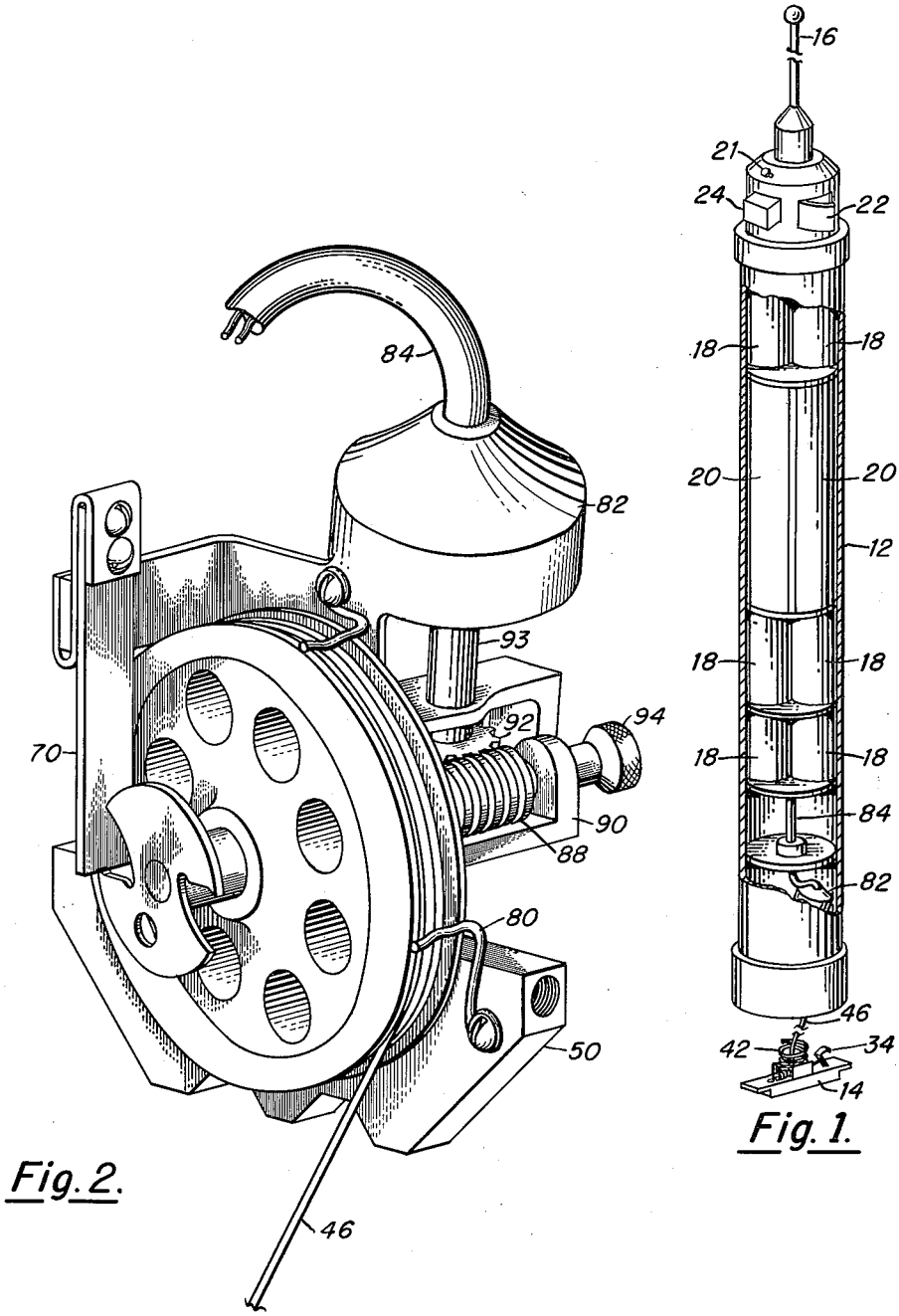

2,978,690

EXPENDABLE LEAD LINE SOUNDER

Franz N. D. Kurie, Alexandria, Va., and Louis A. Cartwright, San Diego, Calif., assignors to the United States of America as represented by the Secretary of the Navy Filed Apr. 10, 1953, Ser. No. 348,142

4 Claims. (Cl. 340—224)

(Granted under Title 35, U.S. Code (1952), sec. 266)

The invention described herein may be manufactured and used by or for the Government of the United States of America for governmental purposes without the payment of any royalties thereon or therefor.

This invention relates to the exploration of inaccessible waters and more particularly to apparatus for determining the depth of water at the position where the apparatus enters the water and transmitting the intelligence, and including separate correlated apparatus for interpreting the intelligence and indicating the depth of the water at a remote station.

Briefly stated, the invention consists of a radio transmitter, lead line depth measuring apparatus and electric batteries all mounted in an elongated buoy adapted to be launched from an aircraft and float upright on the surface of the water. The buoy supports a radio antenna at its upper end and contains a sounding lead attached to one end of a line which is wound around a reel geared to a potentiometer. When the buoy strikes the water, the impact releases the lead weight which unwinds the line from the reel and varies the resistance across the potentiometer. The potentiometer is incorporated in an electronic circuit in a manner which controls the modulation frequency of the transmitted radio signal in proportion to the length of line reeled out before the weight strikes the bottom or reaches the end of the line. Suitable mechanism is provided for locking the reel when the weight has reached the bottom. Also included in the present invention is correlated apparatus for use with a conventional FM receiver and cooperating with depth measuring apparatus incorporated in the buoy to indicate the depth at a remote station such as the launching aircraft. This indicating apparatus is essentially a frequency measuring circuit with a meter calibrated in fathoms or any other desirable units.

One object of the present invention is to provide apparatus for reliably and accurately measuring and indicating the depth of water at any position where such information may be desired.

Other objects and many of the attendant advantages of this invention will be readily appreciated as the same becomes better understood by reference to the following detailed description when considered in connection with the accompanying drawings wherein:

Fig. 1 is a pictorial view illustrating one preferred embodiment of the present invention with a portion of the case broken away to show the interior arrangement of the components;

Fig. 2 is a pictorial view of the reel with the associated gear system and potentiometer;

Figure 3:
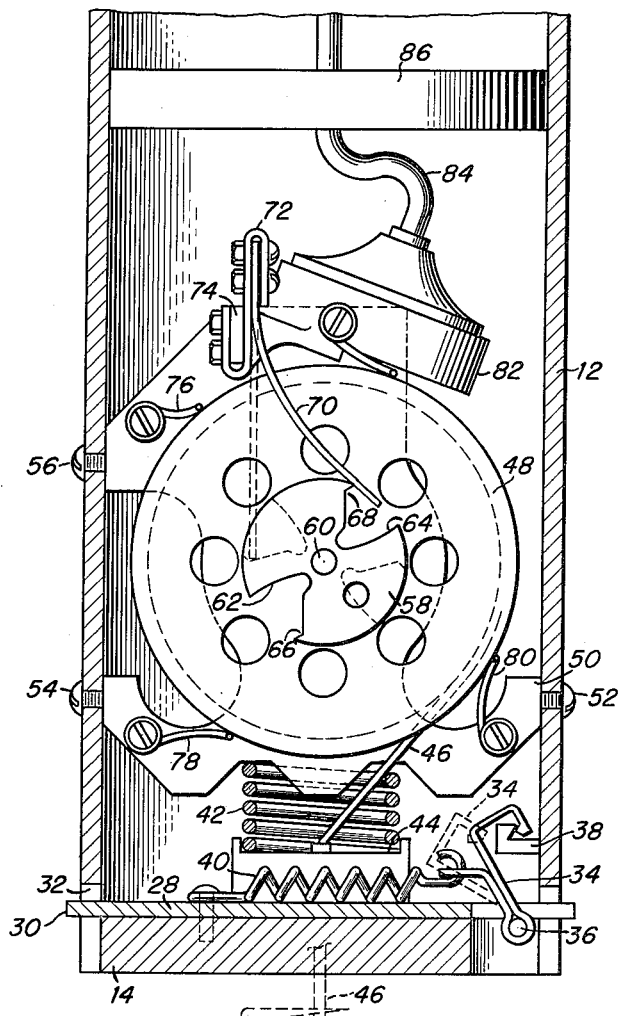
Fig. 3 is a sectional view on an enlarged scale of the lower portion of the buoy illustrating the details of the reel and weight release mechanism with the weight shown in released position in phantom lines.

Referring now to the drawings in detail, the general arrangement of one preferred embodiment of the present invention is illustrated in Fig. 1 and includes a buoyant body 12, a weight 14 adapted to be released from the body 12, and a reel mechanism with a potentiometer to be described in more detail infra. A radio antenna 16 is supported by the buoy on the surface of the water and housed within the body 12 are electric batteries 18 and electronic apparatus 20. A release mechanism 21 actuating a switch (not shown) may be utilized to connect the electronic apparatus to the power supply consisting of batteries 18, before it is launched from an airplane or other craft. A closure 22 is adapted to be opened subsequent to launching the buoy to release a parachute (not shown) which serves to slow the speed of the descent, if the device is dropped from an airplane and also tends to drag in the water and serves to some extent as a sea anchor or drogue for stabilizing the device while floating in the water. A bag of dye 24 may be tied to the buoy and stains the water surrounding it to facilitate visual observation of the position.

A lead or other heavy weight 14 is suitably mounted at the lower end of the buoy and is provided with a plate 28 having an ear 30 extending into an opening 32 and a latch 34 pivotally mounted at 36 engaging the catch 38 for retaining the weight in position during the drop. Upon impact the weight moves upwardly to release the latch 34 from the catch 38 permitting the spring 40 to move the latch into the retracted position shown in dotted lines. The spring 42 engaging in a recess 44 serves to eject the weight after the latch 34 is released.

A line 46 connected at one end to the weight 14 is wound around the reel 48 which is suitably mounted on a bracket 50 secured to the body 12 by suitable fastening means such as the screws 52, 54 and 56. The ratchet wheel 58 mounted on one end of the reel shaft 60 is provided with a pair of oppositely disposed cut-out portions 62 and 64, each provided with a notch 66 and 68 respectively. A detent spring 70 is adapted to ride on the ratchet wheel 58 in the position shown in solid lines in Fig. 3 and moves the ratchet wheel backwards to the dotted line position after the weight strikes the bottom due to the lifting of the buoy by the waves or other motion which will pull the line 46 enough to bring one of the notches 62 under the spring 70 and permit the ratchet to lock. Spring 70 is mounted in a suitable clamp 72 that is attached to an arm 74 extending from bracket 50. Resilient arms 76, 78 and 80 are mounted on the bracket 50 in a position to engage the reel and serve to provide a slight drag to slow down the movement and prevent backlash and the arm 80 also serves as a guide for the line 46. A potentiometer 82 is connected to the electronic apparatus by means of a cable 84 extending through the water-proof bulkhead 86 and is driven by means of a worm 88 mounted on a bracket 90 engaging a worm gear 92 attached to the shaft 93 of potentiometer 82. The rewind knob 94 may be provided, if desired, for laying the line on the reel, and also for rewinding the line, when the device may be recovered to be used again.

Figure 4:
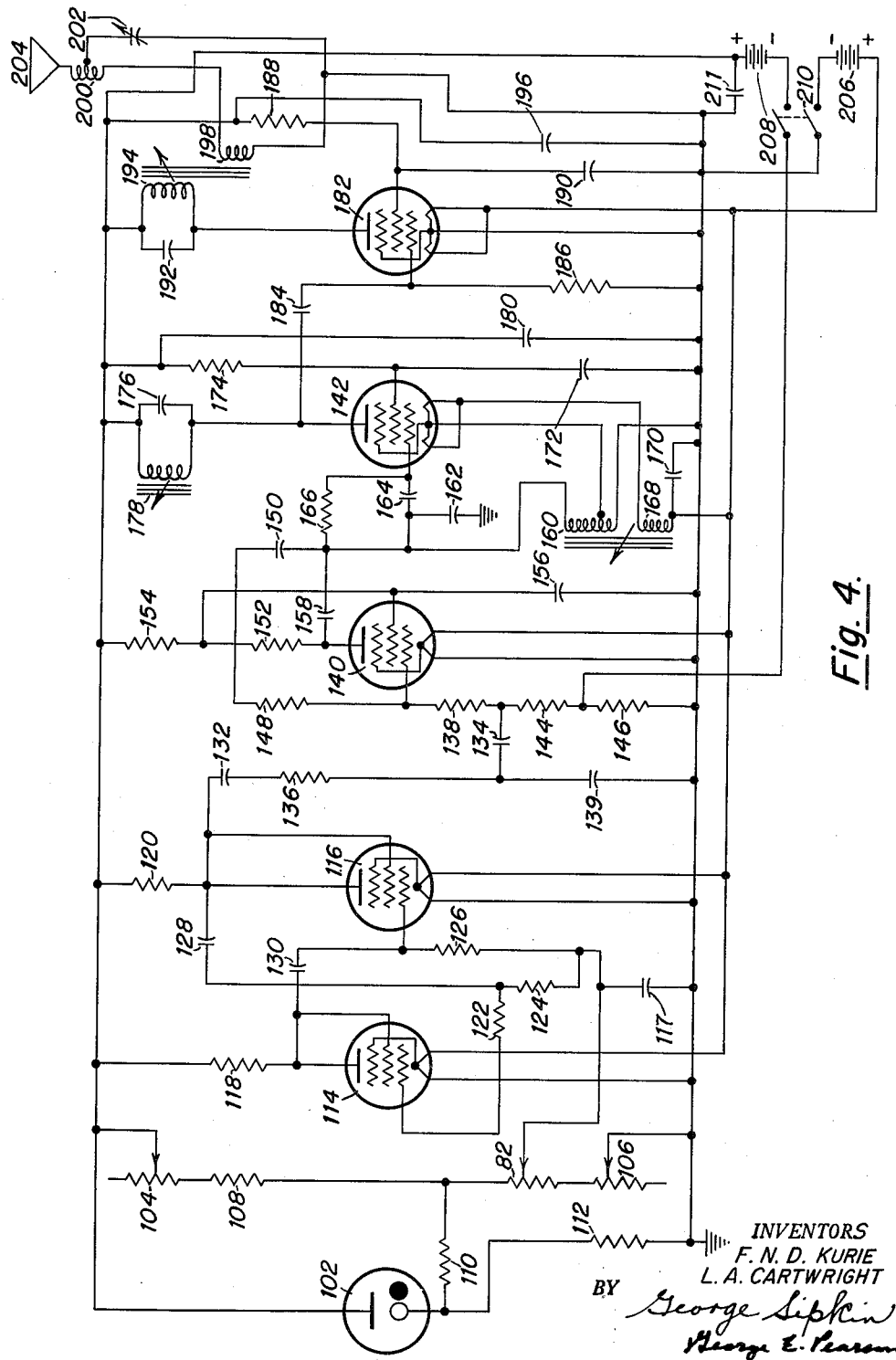
Fig. 4 is a schematic circuit diagram of the electronic apparatus for transmitting the intelligence.

The electronic apparatus utilized to transmit the signal carrying the intelligence is illustrated schematically in Fig. 4, wherein the potentiometer 82 is indicated schematically in the voltage divider circuit also containing the voltage regulator tube 102 which may be of a neon gas discharge type, variable resistors 104 and 106 which are utilized for adjustment of the circuit and fixed resistors 108, 110 and 112.

Potentiometer 82 which is geared to the reel 48 controls the frequency of a multi-vibrator circuit by varying the bias voltage on the grids of tubes 114 and 116. Condenser 117 maintains the bias voltage above ground potential. Resistors 118 and 120 are the plate load resistors of tubes 114 and 116 respectively, while resistors 122 and 124 constitute the grid bias resistance for the grid of tube 114, and resistor 126 is a grid bias resistance for tube 116. Condensers 128 and 130 are charged and discharged through the resistances 124 and 126 respectively in a conventional manner to actuate tubes 114 and 116 as a free-running multi-vibrator. Capacitors 132 and 134 together with resistors 136 and 138 couple the signal from multi-vibrator tubes 114 and 116 to the modulator tube 140 in a conventional frequency modulation transmitting circuit. Capactior 139 is an RF by-pass condenser.

The reactance modulator tube 140 functions as a variable reactance connected in parallel across the tuned circuit of the radio-frequency oscillator tube 142. A portion of the RF oscillator voltage is fed back to the grid of the reactance tube 140 through a phase shifting network which shifts this voltage 90° in phase with respect to the voltage across the oscillator tank. The voltage applied to the grid of the reactance tube causes plate current to flow, which is in phase with the grid voltage and 90° out of phase with the RF voltage across the oscillator tank. For this reason, the voltage developed across the plate-load resistor is 90° out of phase with the RF oscillator tank voltage, and the reactance-tube circuit thus acts as a reactance shunted across the tank circuit of the oscillator. The magnitude of this reactance with no signal voltage applied to the grid is determined by the grid bias of the reactance stage. This reactance value, in combination with the reactance elements of the oscillator tank circuit, determined the mean oscillator frequency. When the signal is applied to the grid of the reactance tube, it, in effect, varies the bias and the apparent reactance at a rate corresponding to the frequency of the multi-vibrator signal. This in turn causes the oscillator frequency to vary about its mean frequency at the signal-frequency rate.

The amount by which the oscillator shifts from mean frequency is called the frequency deviation. The frequency deviation is determined by the amplitude of the signal voltage. To secure the best reception, a frequency deviation of approximately 75 kc. on either side of the mean transmitter frequency is necessary. For this reason this value, ±75 kc., has been arbitrarily chosen as the standard to represent 100% modulation. In FM the term "100% modulation" differs entirely from the meaning associated with it in amplitude-modulated transmitters. For AM, 100% modulation refers to the greatest degree of modulation that can be applied to a carrier wave without resulting in distortion. In frequency modulation, 100% modulation corresponds to the frequency deviation for the loudest signals to be transmitted. This is determined by the design of the equipment and is not limited by distortion as in amplitude modulation.

In carrying out the present invention it is preferable that the frequency deviation of the oscillator produced by the reactance modulator for 100% modulation be ±18.75 kilocycles from the mean oscillator frequency. Since the oscillator frequency is doubled twice in the following stages, the final frequency deviation of the transmitted RF signal would be ±75 kilocycles, i.e., ±18.75 kc.×2×2=±75 kc.

The input circuit of the reactance modulator tube 140 is made up of resistors 138 and 144 together with capacitor 134 which couples the signal voltage to the grid circuit. Resistance 138 acts as an isolating resistor and with the resistance 144 forms a grid leak resistor. Resistance 146 is a bias resistor for the reactance tube. The bias voltage is developed across this resistor by the flow of the plate current from all the tubes in the transmitter through resistance 146. This voltage is of sufficient magnitude to bias the reactance tube 140 to the desired operating point. Resistor 148, capacitor 150 and the grid to cathode capacity of tube 140 form the phase shifting network between the tank circuit and the grid of the reactance tube. The portion of the RF oscillator tank voltage is shifted 90° in phase and applied to the grid of the reactance tube through this circuit. Resistance 152 is a plate load resistor for tube 140 and resistor 154 is the de-coupling resistor in the plate voltage lead. Capacitor 156 is the by-pass condenser for the screen grid, and capacitor 158 is the coupling capacitor between the plate circuit of the reactance tube 140 and the tuned circuit for the oscillator which consists of an inductance coil 160 and a condenser 162.

The control portion of the oscillator is a conventional Hartley circuit utilizing the pentode tube 142 as the oscillator tube and also as one stage of amplification. The screen grid, control grid, and filament of tube 142 are used in the actual oscillator control circuit and the signal is amplified in the plate circuit. The radio frequency energy from this control circuit is coupled to the plate output circuit by means of the cathode plate current electronic stream. By using an electronic coupling the control section of the oscillator is electrically isolated from the load portion of the circuit. This results in a greater degree of frequency stability under varying load conditions.

The tuned circuit of the oscillator control section consists of inductor coil 160 and capacitor 162. The resonant frequency of this type of circuit is preferably approximately 17.5 megocycles for the reasons stated supra. The tuned circuit has a high Q and capacitor 162 preferably has a negative temperature coefficient. These factors provide good frequency stability at this high radio frequency. The operating frequency of the control section is adjusted by varying the inductance of coil 160 by means of the movable polyiron core of the inductor. The bias of the oscillator is determined by the values of capacitor 164 and resistor 166.

The two halves of the filament of the oscillator tube 142 are connected in parallel. The filament must be maintained at RF potential above ground for the cricuit to function properly. When both sides of the filament are maintained at the same RF potential, maximum power output is obtained from the oscillator. To assure that the positive and negative ends of the filament halves will be at the same RF potential, a four-turn coil 168 is connected to the positive A-battery lead and by-passed to ground by condenser 170. The other end of the coil is connected to one terminal of the parallel filament sections. The induced RF voltage in this extra winding is thus applied to the positive terminal of both halves of the filament. The center tap or other end of each half of the filament is connected to a tap on coil 160, four turns up from the ground end. From this tap on coil 160, an RF voltage, equal to and of the same polarity with respect to ground as the voltage in the extra coil, is applied to the negative terminal of the filament. These voltages being equal and of the same polarity result in the entire filament being maintained at a constant RF potential above ground.

Capacitor 172 is the RF by-pass condenser for the screen grid of tube 142 and resistor 174 is the screen dropping resistor. The output circuit of tube 142 is composed of the fixed capacitor 176 and the variable inductance coil 178 constituting a tank circuit the frequency of which is tuned to the second harmonic of the oscillator control section which would preferably be approximately 35 megacycles. Tuning is accomplished by varying the inductance of coil 178 by means of a movable polyiron core. Capacitor 180 is an RF by-pass condenser for the plate high-voltage lead.

A pentode vacuum tube 182 serves as the radio frequency power amplifier and frequency doubler. The output of the electron-coupled oscillator-doubler is coupled to the grid of tube 182 by a capacitor 184. Resistor 186 is the grid bias resistor for tube 182. The screen grid dropping resistor 188 and the screen RF by-pass condenser 190 perform their normal functions.

The output plate circuit of tube 182 is the tuned tank consisting of the fixed capacitor 192 and the variable inductor 194. Capacitor 192 is preferably a silver-mica capacitor with a negative temperature coefficient and coil 194 is a variable inductor tuned by a movable polyiron core. This resonant circuit is tuned to twice the input frequency and will preferably be approximately 70 megacycles. Since the input circuit and output circuits operate on such widely different frequencies, there is no need for neutralization. Capacitor 196 is an RF by-pass condenser used to keep the B+ lead of coil 194 at RF ground potential.

The antenna coupling coil 198 is wound as a second winding on coil 194 and in conjunction with the antenna loading coil 200 and the variable capacitor 202 it serves to couple the output of the RF doubler amplifier to the antenna 204. Tuning is accomplished by varying the capacity of condenser 202 until the coupled circuit is in resonance at the transmitter frequency.

Batteries are almost necessarily used to supply all of the required electrical power and should be sufficient to operate the radio transmitter and the multi-vibrator circuits for a substantial length of time depending on the particular use of the device. The A-battery power supply 206 preferably consists of a plurality of dry cells connected in parallel to supply the voltage for the filament circuits and will ordinarily supply a filament voltage of approximately 1½ volts.

The B-battery power supply 208 preferably consists of two or more high voltage miniature B-batteries connected in series to supply the voltage for the plate and screen grid circuits of the transmitter and the multi-vibrator circuits. The total output voltage of power supply 208 normally is approximately 135 volts.

The power is turned on and off by a double-pole single-throw spring-actuated switch 210 which is released for closing the circuit when the buoy is launched from the plane or other station, by the release mechanism 21 not disclosed in detail in the present application. Condenser 211 is a by-pass condenser for radio frequencies from the B+ side of power supply 208 to ground.

Figure 5:
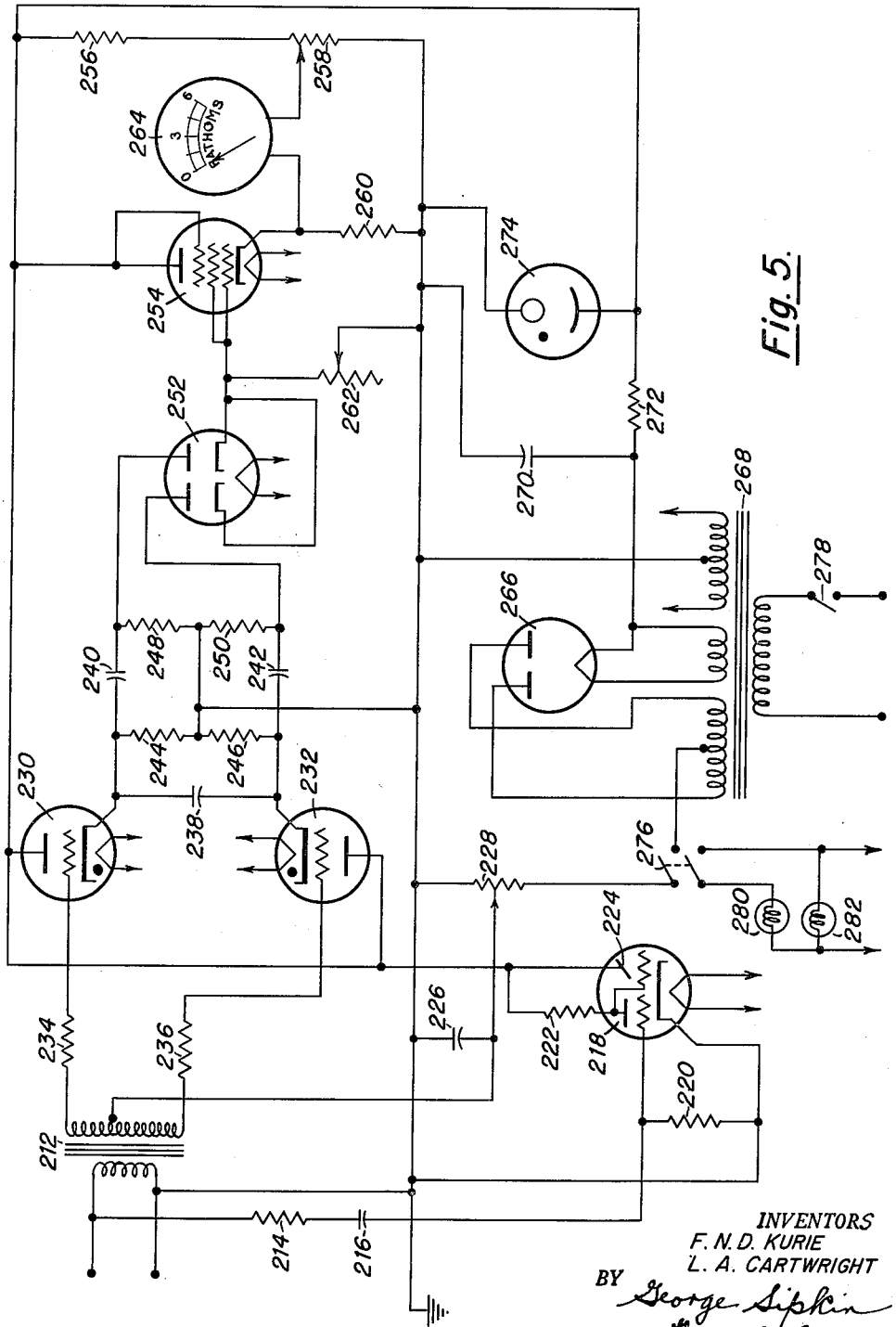
Fig. 5 is a schematic circuit diagram of the electronic apparatus adapted to be used in conjunction with a conventional receiver for indicating the depth of water ascertained by the lead line mechanism shown in Fig. 3.

The schematic circuit diagram of Fig. 5 illustrates one preferred embodiment of apparatus to be used in conjunction with a conventional FM receiver circuit (not shown) for indicating the depth of water at a remote station in conjunction with the apparatus of Figs. 1 through 4 for determining the depth and transmitting a frequency modulated radio signal.

The conventional FM receiver will normally receive and demodulate the radio signal and its output signal will have a frequency correlated to the depth of water and corresponding to the frequency output of the multi-vibrator circuit including tubes 114 and 116. This output signal is supplied to the primary winding of transformer 212 in Fig. 5 and is also coupled through resistor 214 and capacitor 216 to the grid of a conventional electron ray indicator tube 218 which serves as a visual signal indicator to show when there is sufficient signal strength for proper operation.

Resistor 220 is the grid bias resistor for the triode grid of tube 218 and resistor 222 is the load resistor in the series-triode side of the indicator tube. The second grid of tube 218 is tied to the triode plate and controls the flow of electrons to the target 224.

Capacitor 226 is a by-pass condenser and variable resistance 228 is connected to the center tap on the secondary winding of transformer 212 for maintaining the desired negative operating bias on the grids of gas triode tubes 230 and 232, the signal being applied to the grids from the secondary winding through resistors 234 and 236 respectively. These thyratron tubes 230 and 232 operate through an RC discriminating circiut consisting of capacitors 238, 240 and 242 and resistors 244, 246, 248 and 250, and through a duo-diode tube 252 into a vacuum tube bridge consisting of pentode tube 254 and resistors 256, 258 and 260. The cathodes of tube 252 are grounded through a variable resistor 262.

A D.-C. milliammeter 264 is connected across the bridge to read the average current which is proportional to the frequency of the input signal and may be calibrated to read directly in fathoms which are directly proportional to the signal frequency.

The conventional power supply consists preferably of a full wave rectifier tube 266 suitably connected to a power transformer 268 and supplying a steady D.-C. voltage to the circuit through the filter condenser 270 and resistor 272 in conjunction with a voltage regulator tube 274.

Suitable switches 276 and 278 and pilot lamps 280 and 282 are provided to perform their normal functions.

Obviously many modifications and variations of the present invention are possible in the light of the above teachings. It is therefore to be understood that within the scope of the appended claims the invention may be practiced otherwise than as specifically described.

What is claimed is:

1. In combination, depth sounding apparatus including a weighted line extended from the surface to the bottom, a potentiometer operatively associated with said depth sounding apparatus and adapted to be varied thereby in accordance with the depth measured by the extended length of said line, a frequency modulation radio transmitter, and a free running multi-vibrator circuit associated with said transmitter for modulating the mean frequency thereof in accordance with the operating frequency of the multi-vibrator circuit, said potentiometer being connected in said multi-vibrator circuit for varying the operating frequency thereof to produce a signal having a frequency proportional to the measured depth and an electronic circuit adapted to be used in conjunction with a frequency modulation receiver and including means for indicating the depth corresponding to the signal frequency, said indicating means including an electron tube inverter operating into an electron tube bridge through an RC discriminating circuit and a direct current milliammeter calibrated to indicate the depth connected across said bridge.

2. In combination, depth sounding apparatus comprising a buoy, a reel rotatively mounted in said buoy, a weighted line mounted on said reel and adapted to be played out by gravity thereby rotating said reel until the line contacts the bottom, a potentiometer rotatively linked to said reel and adapted to produce a variable impedance in proportion to the length of line played out, means for removing slack from the line and maintaining a fixed impedance on the potentiometer after the line reaches the bottom, a frequency modulation radio transmitter, a control circuit associated with said transmitter, said impedance being connected in said control circuit for modulating the mean frequency of said transmitter to produce a radio signal correlated to the measured depth, and an electronic circuit adapted to be used in conjunction with a frequency modulation receiver and including means for indicating the depth corresponding to the modulated radio signal, said indicating means including a meter calibrated to indicate the depth measured.

3. In combination, depth sounding apparatus including a weighted line extended from the surface to the bottom, a variable impedance operatively associated with said depth sounding apparatus and adapted to be varied thereby in accordance with the depth measured by the extended length of said line, a frequency modulation radio transmitter, a multi-vibrator circuit associated with said transmitter for modulating the mean frequency thereof, said impedance being connected in said multi-vibrator circuit for varying the operating frequency thereof to produce a signal having a frequency proportional to the measured depth, and an integrating electronic circuit adapted to be used in conjunction with a frequency modulation receiver and including a meter adapted to measure the current through a portion of said circuit wherein the current is proportional to the signal frequency, said meter being calibrated to indicate the depth measured by said measuring means.

4. In combination, depth sounding apparatus including a weighted line extended from the surface to the bottom, a variable impedance operatively associated with said depth sounding apparatus and adapted to be varied thereby in accordance with the depth measured by the extended length of said line, a frequency modulation radio transmitter, a multi-vibrator circuit associated with said transmitter for modulating the mean frequency thereof, said impedance being connected in said multi-vibrator circuit for varying the operating frequency thereof to produce a signal having a frequency proportional to the measured depth, and an electronic circuit adapted to be used in conjunction with a frequency modulation receiver and including means for indicating the depth corresponding to the signal frequency, said indicating means including an electron tube inverter operating into an electron tube bridge through an RC discriminating circuit and a depth indicating meter across said bridge.

References Cited in the file of this patent
UNITED STATES PATENTS

| | | |
|---|---|---|
| 1,286,155 | Vallaro | Nov. 26, 1918 |
| 1,866,902 | Overmire | July 12, 1932 |
| 2,414,091 | Chappell | Jan. 14, 1947 |
| 2,422,449 | Usselman | June 17, 1947 |
| 2,464,834 | Taylor | Mar. 22, 1949 |
| 2,519,418 | Urick | Aug. 22, 1950 |
| 2,586,828 | Keeran | Feb. 26, 1952 |
| 2,610,506 | Taliaferro et al. | Sept. 16, 1952 |

FOREIGN PATENTS

| | | |
|---|---|---|
| 141,673 | Great Britain | Apr. 14, 1921 |

OTHER REFERENCES

Pickering: The Radio Sonde, Proc. IRE, vol. 31, No. 3, pages 479–485 (September 1943).